Oct. 28, 1930.  C. R. KRANZ  1,780,020
SPRAY COOLING TOWER
Filed Jan. 15, 1927  2 Sheets-Sheet 2
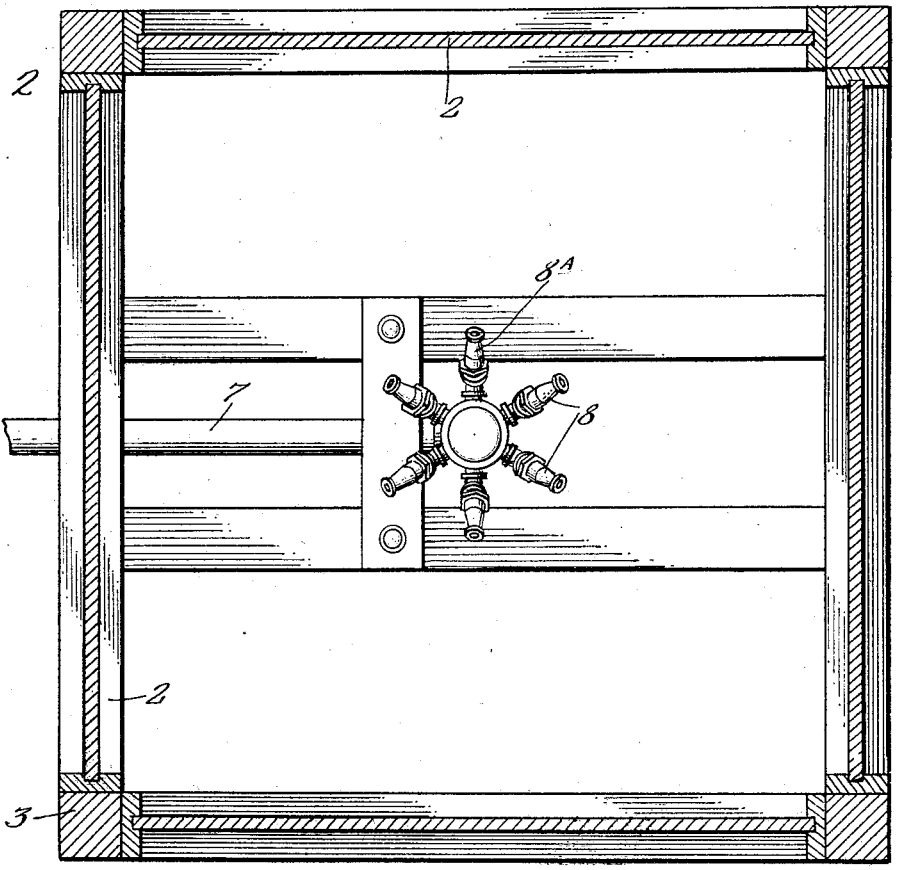
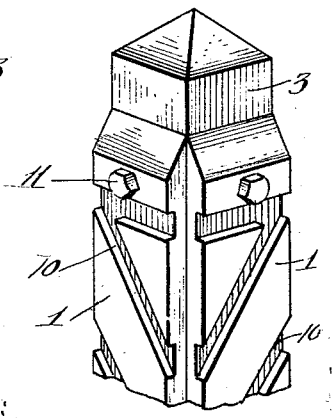
Inventor:
Chester R. Kranz
by Albert Scheible
Attorney Patented Oct. 28, 1930

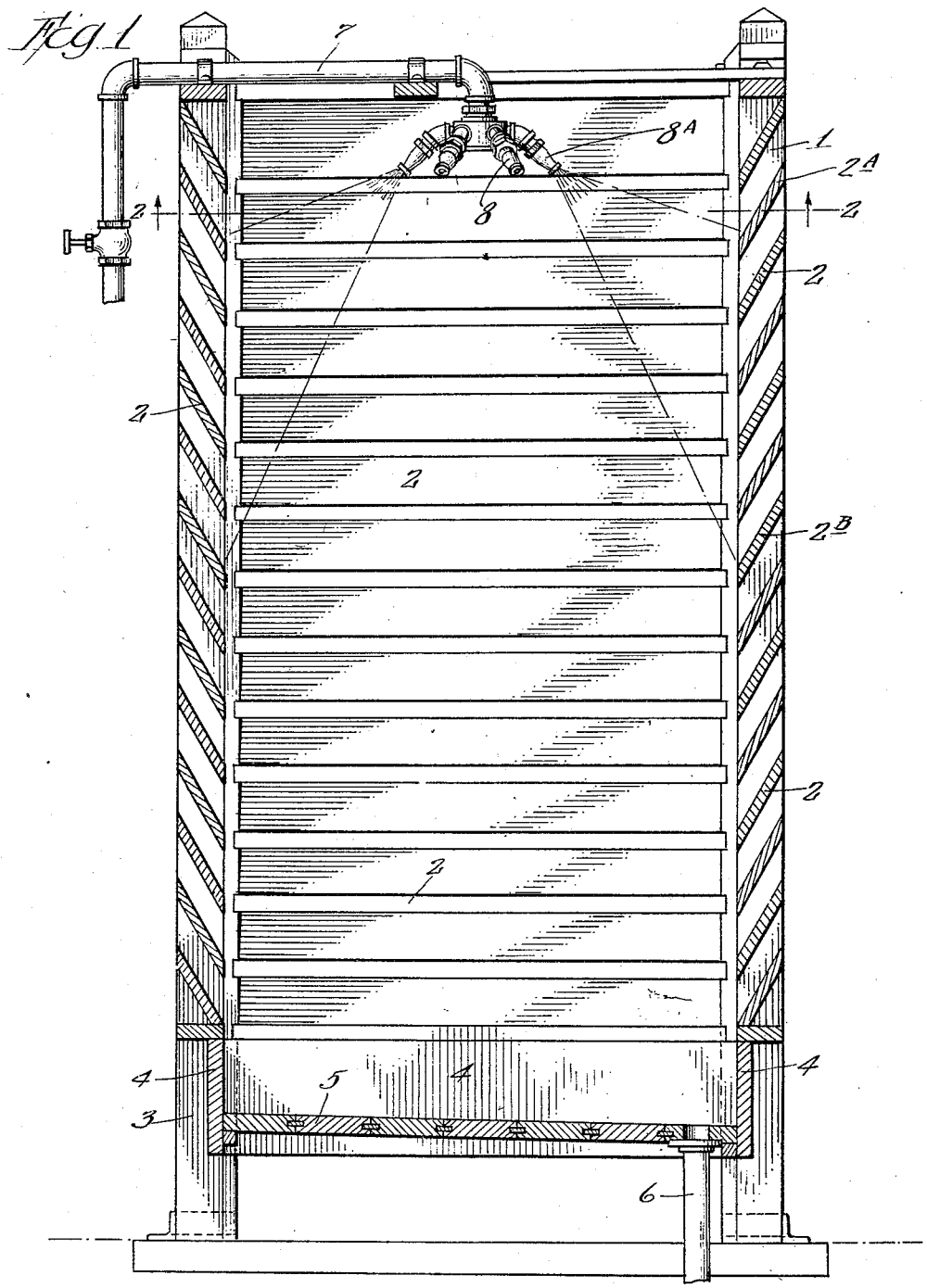

1,780,020

UNITED STATES PATENT OFFICE

CHESTER R. KRANZ, OF GLEN ELLYN, ILLINOIS, ASSIGNOR, BY MESNE ASSIGNMENTS, TO BINKS MANUFACTURING COMPANY, OF CHICAGO, ILLINOIS, A CORPORATION OF DELAWARE

SPRAY-COOLING TOWER

Application filed January 15, 1927. Serial No. 161,300.

My invention relates to means for cooling water by exposure to cooler air, and aims to provide a cooling tower for this purpose which will be usually compact and light in proportion to its capacity; which will involve relatively small expense for the packing, shipping and erecting, and which will be durable.

Heretofore, the hot water issuing from steam power units of the condensing type—or from water cooled transformers, refrigerating units, evaporators and the like—has commonly been cooled either by the spray pond system, or by means of cooling towers in which the water trickles successively over louvres and also over baffles or grids. The spray pond system, in which the hot water is ejected in the form of a spray from a large number of upwardly directed spray nozzles disposed above a water catching pool requires a large area, such as not available at most industrial plants where such water cooling is required.

The usual cooling tower system requires less ground space and hence lends itself to installation on roofs, but introduces two other objections, one being the weight of such towers which limits their use to unusually strong or specially braced roofs. The other objection lies in the rather low efficiency in comparison with the spray pond system, since the water in the customary cooling towers flows in sheets over the louvres and other intercepters and successively from one of these to another, thereby presenting a quite small surface of water to the air in proportion to the amount of water. Moreover, the pressure of any baffles or grids within such a cooling tower retards the movement of air and further reduces the efficiency of such a tower.

My present invention provides an arrangement which effectively combines desirable features of both of the older types of cooling systems by subjecting all of the water to intermingling and substantially unrestricted air currents while the water is in the form of a finely divided spray, and by also finely dividing the drip from one intercepter to another so as to present relatively large water surfaces to the cooling air. Moreover, it provides an arrangement for this purpose in which the slotted walls of a cooling tower serve partly as air shields for preventing finely sprayed water from being carried outside of the tower and wasted, and in which the sprayed water is subjected to the cooling action of the air during a relatively long travel.

Further and more detailed objects will appear from the following specification and from the accompanying drawings, in which—

Fig. 1 is a central and vertical section through a square spray-cooling tower embodying my invention and employing louvres of wood, the section being taken parallel to one of its sides.

Fig. 2 is a horizontal section taken along the line 2—2 of Fig. 1, looking upward.

Fig. 3 is a fragmentary perspective view of the top end of a corner post and of the louvre-supporting strips fastened to this post.

In the embodiment of Fig. 1, my spray-cooling tower includes louvre sides spanning the spaces between four corner posts, a water collecting pan supported by the posts below the said louvre sides, and means for projecting the hot water in the form of a spray downwardly and outwardly against the upper portions of the louvre sides.

Each louvre side consists of two flat end strips 1 spanned by a plurality of parallel and vertically spaced flat louvre slats 2, which slats have their ends mortised into grooves 10 in the end strips 1. Thus constructed, each louvre side forms a rigid unit which can readily be attached to the adjacent corner posts 3 by fastening the end strips respectively to these posts, as for example by bolts 11. Each louvre strip slopes downward inwardly of the tower at a considerable angle, and preferably at more than 45 degrees from the horizontal axis of the tower, and the width of each louvre is such in proportion to the spacing of the louvres that the outer edge of each one extends considerably above the bottom of the next higher louvre. The water collecting pan has its opposed pairs of sides 4 spaced by distance at least equal to the distances between the inner edges of the slats of the two corresponding louvre sides and has a bottom 5 which desirably slopes toward one corner of the bottom, from which corner a drain pipe 6 affords an outlet for the collected water.

The hot water is fed into the tower under pressure through a supply pipe 7 connected to spray nozzles 8 disposed at the top of the tower, and in the case of a square tower these nozzles are preferably disposed as a cluster. Each spray nozzle is preferably of a type which will project the water in the form of a conical full mass spray—as for example the spray nozzle shown in the Binks Patent No. 1,282,175 of October 22, 1918, the construction of which nozzle also imparts a whirling movement to the spray issuing from it.

The axis of each spray nozzle is inclined downwardly and directed toward one or more of the louvre sides, and preferably at such a downward angle that most of the spray directly striking the louvres will rebound into the interior of the tower. Thus, in the illustrated embodiment, the louvre slats have their upper faces at angles of about 60 degrees from the horizontal, the spray nozzle axes are disposed at angles of about 45 degrees from the horizontal, and the nozzles are designed so that the spray spreads through a dispersion angle of about 80 degrees. Consequently, the spray from a nozzle 8A which has its axis in a plane at right angles to the general plane of the right-hand side of Fig. 1 will have its upper edge sloping slightly downward against the top of the louvre slat 2A while its lower edge slopes downward at a much greater angle to the vertical and will strike a much lower slat 2B. With such angles and with the louvre slats suitably spaced, most of the direct spray striking the slats will be reflected back into the interior of the tower, though some spray will also rebound against the lower faces of other slats and will drop from these latter slats to the slats directly below them.

Consequently, with fine mass sprays delivered by the nozzles, the entire interior of the tower is promptly filled with a mistlike mass of fine spray in which currents are set up by the spray rebounding from the several louvre sides and by the interaction of the several whirling sprays on each other. The generally downward movement of the spray, due to the downward direction of the nozzles, continually draws air downward through the open top of the tower and also through the spaces between the slats, so that the fine spray descending and whirling about in the tower is subjected to the cooling action of a large amount of air before it reaches the collecting pan. Moreover, since the interior of the tower is not obstructed by baffles, grids or the like and since the fine spray is of low specific gravity, this spray is kept in suspension and in contacting relation to air currents for a relatively long time before it reaches the collecting pan. The spray caught by the slats combines into water drops, and which trickles gradually down along the inner edges of the slats from one louvre to the next lower one, successively encounters the currents of air drawn into the tower between the louvres. Hence this water is also subjected to the cooling effect of a large amount of air, since this trickling water initially reaches the louvres in the form of spray, it descends in thin films and hence presents a relatively large surface to the cooling action of the air.

To enhance the cooling action, I preferably proportion the tower and dispose the nozzles so that a considerable proportion—as for example one-half—of the louvre sides will be below the range of the projected spray. This proportion may be varied somewhat, but preferably is not over two-thirds, so that spray is directed against at least the upper third of each side. I also desirably make each louvre slat of such a width in proportion to its inclination and of such a spacing from the next higher slat that the outer edge of each louvre slat will extend above the bottom of the next higher slat. By doing this, I cause any prevailing wind from one side of the tower to produce air currents which will deflect the spray downwardly without blowing it out of the tower at the other side, thus leaving my tower highly efficient regardless of the existing winds.

In practice, my tower can easily be built of such a height that the direct distance traversed by the spray in passing from the nozzle to the collecting pan is at least equal to that traversed by the spray from nozzles over an efficient type of spray cooling pond; and, owing to the air currents within the tower, the actual traversed distance is considerably increased, so that I can secure a prolonged contact of air with the finely divided spray. Moreover, by using diverging nozzles delivering correspondingly diverging cones of spray, I secure a large water cooling capacity in proportion to the floor space (or roof space) occupied by the tower. In using such spray-cooling towers, the angle of divergence of the spray can be increased or decreased by correspondingly varying the pressure at which the water is pumped into the supply pipe, so that the cooling capacity of a given tower can be varied considerably according to the temperature of the water and of the air.

With the louvres and the collecting pan constructed of wood, as shown in Figs. 1 and 3, I desirably use such a wood as cypress. Each louvre side can be constructed and erected as a unit, and the tower sides can be packed on each other for compact and comparatively inexpensive carting and shipping. For the same cooling capacity, my spray tower is smaller and much lighter than a drip-cooling tower of the type heretofore employed; hence it is cheaper to construct and to erect, and such a light weight spray cooling tower also can be used on roofs which would not support the weight of a drip-cooling tower of the same capacity.

However, while I have illustrated and described my spray cooling tower in a form which has shown good results, I do not wish to be limited to the construction and arrangement thus disclosed, since many changes might be made without departing either from the spirit of my invention or from the appended claims. For example, the number and size of the nozzles, the number of sides of the tower and their width in proportion to their height can be varied according to the required water cooling capacity. In the illustrated embodiment, I have secured good results with the spray nozzles about twelve feet above the water collecting pan and with a pressure of from ten to fifteen pounds at the nozzles, but these figures may also be varied. Moreover, I do not wish to be limited to the use of my tower for cooling water, as it obviously might be employed also for cooling other liquids.

I claim as my invention:

1. A liquid cooling tower comprising side walls having inwardly and downwardly inclined louvres, the space within said tower defined by said walls being unobstructed, and outwardly directed discharge means at the upper end of the tower for spraying the liquid to be cooled in a downward and outward direction directly against the upper faces of the louvres.

2. A liquid cooling tower comprising side walls having inwardly and downwardly inclined louvres, and a set of downwardly divergent nozzles at the upper portion of the tower for spraying the liquid to be cooled downwardly and outwardly against the upper sides of the louvres.

Signed at Chicago, Illinois, January 12th, 1927.

CHESTER R. KRANZ.